(12) United States Patent
Ma

(10) Patent No.: US 12,431,835 B1
(45) Date of Patent: Sep. 30, 2025

(54) AERODYNAMIC SOLAR CELL SYSTEM

(71) Applicant: Fushun Ma, Stone Mountain, GA (US)

(72) Inventor: Fushun Ma, Stone Mountain, GA (US)

( * ) Notice: Subject to any disclaimer, the term of this patent is extended or adjusted under 35 U.S.C. 154(b) by 300 days.

(21) Appl. No.: 18/127,158

(22) Filed: Mar. 28, 2023

(51) Int. Cl.
| | |
|---|---|
| *H02S 20/23* | (2014.01) |
| *F24S 25/00* | (2018.01) |
| *H02S 20/22* | (2014.01) |
| *H02S 20/30* | (2014.01) |
| *H02S 30/00* | (2014.01) |

(52) U.S. Cl.
CPC ............ *H02S 20/23* (2014.12); *F24S 25/00* (2018.05); *H02S 20/22* (2014.12); *H02S 20/30* (2014.12); *H02S 30/00* (2013.01); *Y02E 10/47* (2013.01)

(58) Field of Classification Search
CPC .......... H02S 20/22; H02S 20/23; H02S 20/30; H02S 30/00; F24S 25/00; Y02E 10/47
See application file for complete search history.

(56) References Cited

U.S. PATENT DOCUMENTS

| | | | |
|---|---|---|---|
| 4,887,589 A * | 12/1989 | Frohardt | F24S 30/452 |
| | | | 353/3 |
| 5,181,678 A * | 1/1993 | Widnall | B64C 3/48 |
| | | | 114/127 |
| 8,469,313 B2 | 6/2013 | Dong | |
| 8,746,620 B1 * | 6/2014 | Moussouris | B64C 1/34 |
| | | | 244/123.1 |
| 9,003,739 B2 | 4/2015 | Kudav | |
| 9,184,328 B1 | 11/2015 | Vasilantone | |
| D772,157 S | 11/2016 | Banerjee | |
| 9,595,910 B2 * | 3/2017 | Grimsley | H02S 20/30 |
| 9,650,786 B2 * | 5/2017 | Weaver | F24F 13/15 |
| 9,780,719 B2 | 10/2017 | Atchley | |
| 10,411,642 B2 * | 9/2019 | Grimsley | H02S 20/00 |
| 10,468,545 B1 * | 11/2019 | Yang | H10F 19/80 |
| 10,615,300 B2 | 4/2020 | Inaba | |
| 10,933,973 B2 * | 3/2021 | Kruse | B64C 3/185 |
| 11,264,941 B1 * | 3/2022 | Carless | H02S 20/10 |
| 2008/0245928 A1 * | 10/2008 | Kulesha | B64C 3/187 |
| | | | 244/123.1 |
| 2010/0043781 A1 * | 2/2010 | Jones | F24S 25/16 |
| | | | 126/704 |
| 2010/0090497 A1 * | 4/2010 | Beckon | B60Q 1/44 |
| | | | 296/180.1 |

(Continued)

FOREIGN PATENT DOCUMENTS

| | | | | |
|---|---|---|---|---|
| CN | 104229120 B | * | 9/2016 | |
| WO | WO-2015100474 A1 | * | 7/2015 | F24J 2/4638 |

(Continued)

*Primary Examiner* — Jessie T Fonseca
(74) *Attorney, Agent, or Firm* — Kyle A. Fletcher, Esq.

(57) ABSTRACT

The aerodynamic solar cell system is an airfoil. The aerodynamic solar cell system incorporates an airfoil structure, a pedestal structure, a roof structure, and a photovoltaic cell structure. The photovoltaic cell structure mounts on the of the airfoil structure. The pedestal structure attaches the airfoil structure to the roof structure. The aerodynamic solar cell system is adapted for use in the wind. The wind flows around the structure formed by airfoil. The airfoil structure is an elastic structure. The airfoil structure is an adaptive structure. The response of the airfoil structure to changes in the lift forces minimizes the load transferred from the airfoil structure to the roof structure through the pedestal structure.

11 Claims, 7 Drawing Sheets

(56) References Cited

U.S. PATENT DOCUMENTS

| | | | |
|---|---|---|---|
| 2011/0146753 A1 | 6/2011 | Johnson | |
| 2013/0104966 A1* | 5/2013 | Grip | B64U 50/19 |
| | | | 438/73 |
| 2014/0109953 A1 | 4/2014 | Aulich | |
| 2014/0190556 A1* | 7/2014 | Conger | F24S 80/60 |
| | | | 52/173.3 |
| 2014/0224298 A1* | 8/2014 | Grimsley | F24S 25/00 |
| | | | 136/246 |
| 2014/0299178 A1 | 10/2014 | Devlin | |
| 2015/0083198 A1* | 3/2015 | Jimbo | F24S 40/85 |
| | | | 136/251 |
| 2016/0065116 A1* | 3/2016 | Conger | H02S 20/10 |
| | | | 136/251 |
| 2016/0329859 A1* | 11/2016 | Cap | F24S 25/50 |
| 2017/0051720 A1* | 2/2017 | Grigg | F03D 3/005 |
| 2019/0063787 A1* | 2/2019 | Sylvan | F24S 70/12 |
| 2019/0329861 A1* | 10/2019 | Kruse | B64C 3/185 |
| 2020/0077540 A1* | 3/2020 | Yen | G01S 7/497 |
| 2020/0144432 A1 | 5/2020 | Jeon | |
| 2021/0091715 A1 | 3/2021 | Miller | |
| 2022/0048649 A1* | 2/2022 | Kafantaris | B64G 1/407 |
| 2022/0173690 A1* | 6/2022 | Dick | H02S 20/10 |
| 2023/0261128 A1* | 8/2023 | Thakkar | H10F 71/00 |
| | | | 136/251 |
| 2023/0272945 A1* | 8/2023 | Gallardo Pinto | F24S 30/425 |
| | | | 126/694 |
| 2023/0327604 A1* | 10/2023 | Luedke | F24S 30/425 |
| 2023/0420588 A1* | 12/2023 | Thakkar | H10F 19/85 |

FOREIGN PATENT DOCUMENTS

| | | | |
|---|---|---|---|
| WO | WO-2017004657 A1 * | 1/2017 | |
| WO | 2018115724 | 6/2018 | |

* cited by examiner

AERODYNAMIC SOLAR CELL SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of relatively movable parts of wing structures. (B64C3/48)

SUMMARY OF INVENTION

The aerodynamic solar cell system is an airfoil. The aerodynamic solar cell system comprises an airfoil structure, a pedestal structure, a roof structure, and a photovoltaic cell structure. The photovoltaic cell structure mounts on the of the airfoil structure. The pedestal structure attaches the airfoil structure to the roof structure. The aerodynamic solar cell system is adapted for use in the wind. The wind flows around the structure formed by airfoil. The airfoil structure is an elastic structure. The airfoil structure is an adaptive structure. By adaptive structure is meant that the form factor of the airfoil structure changes in response to the lift forces that are applied to the airfoil structure as the wind flows around the airfoil structure. The response of the airfoil structure to changes in the lift forces minimizes the load transferred from the airfoil structure to the roof structure through the pedestal structure. The photovoltaic cell has a curvature as a result of being attached onto the airfoil structure either in its non-responsive state or during either the superior deformation or the inferior deformation. The curvature of the photovoltaic cell increases solar cell efficiency in that more sunlight is able to interact with the photovoltaic cell throughout daylight.

These together with additional objects, features and advantages of the aerodynamic solar cell system will be readily apparent to those of ordinary skill in the art upon reading the following detailed description of the presently preferred, but nonetheless illustrative, embodiments when taken in conjunction with the accompanying drawings.

In this respect, before explaining the current embodiments of the aerodynamic solar cell system in detail, it is to be understood that the aerodynamic solar cell system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the aerodynamic solar cell system.

It is therefore important that the claims be regarded as including such equivalent construction insofar as they do not depart from the spirit and scope of the aerodynamic solar cell system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
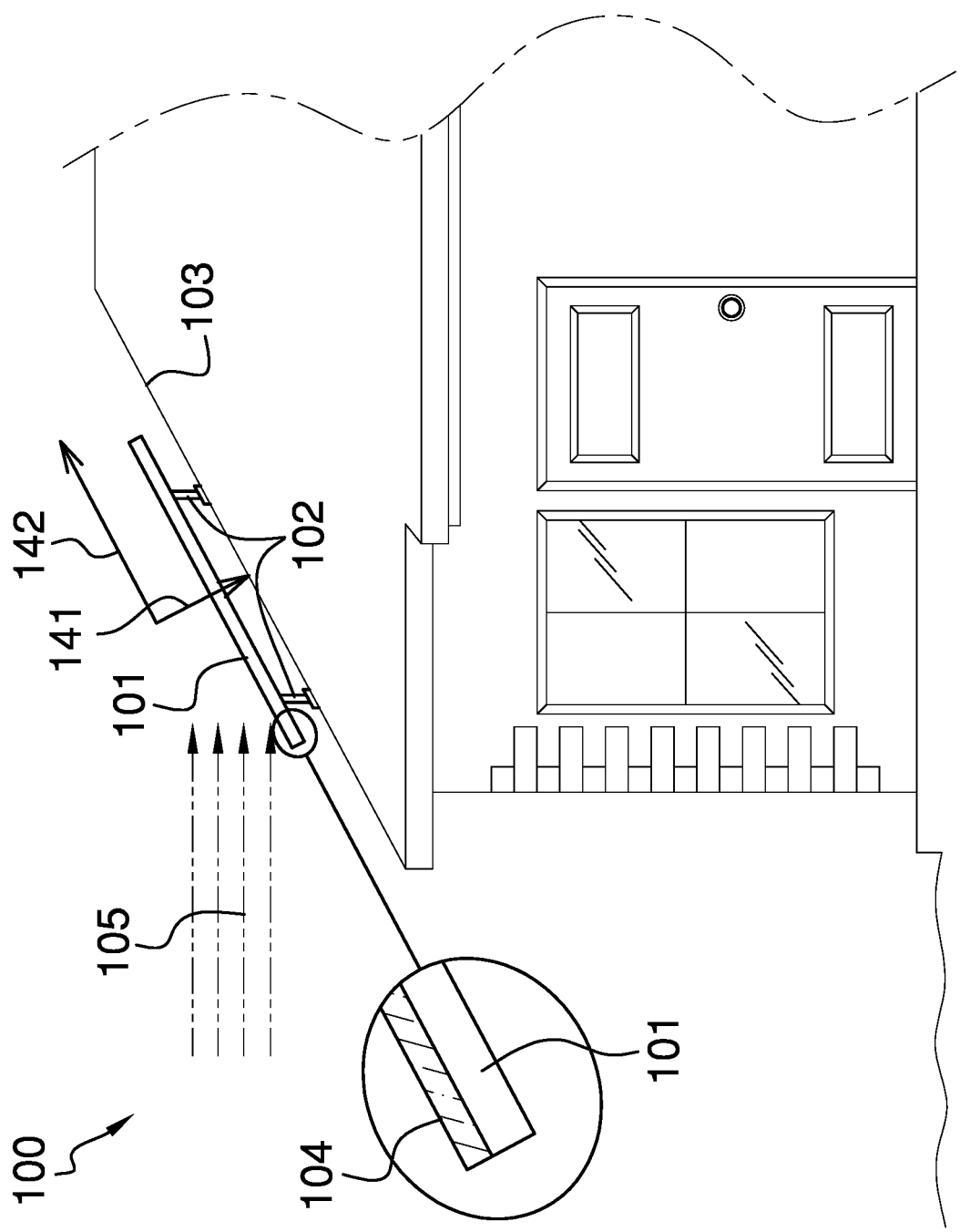
FIG. 1 is a side view of an embodiment of the disclosure.
Figure 2:
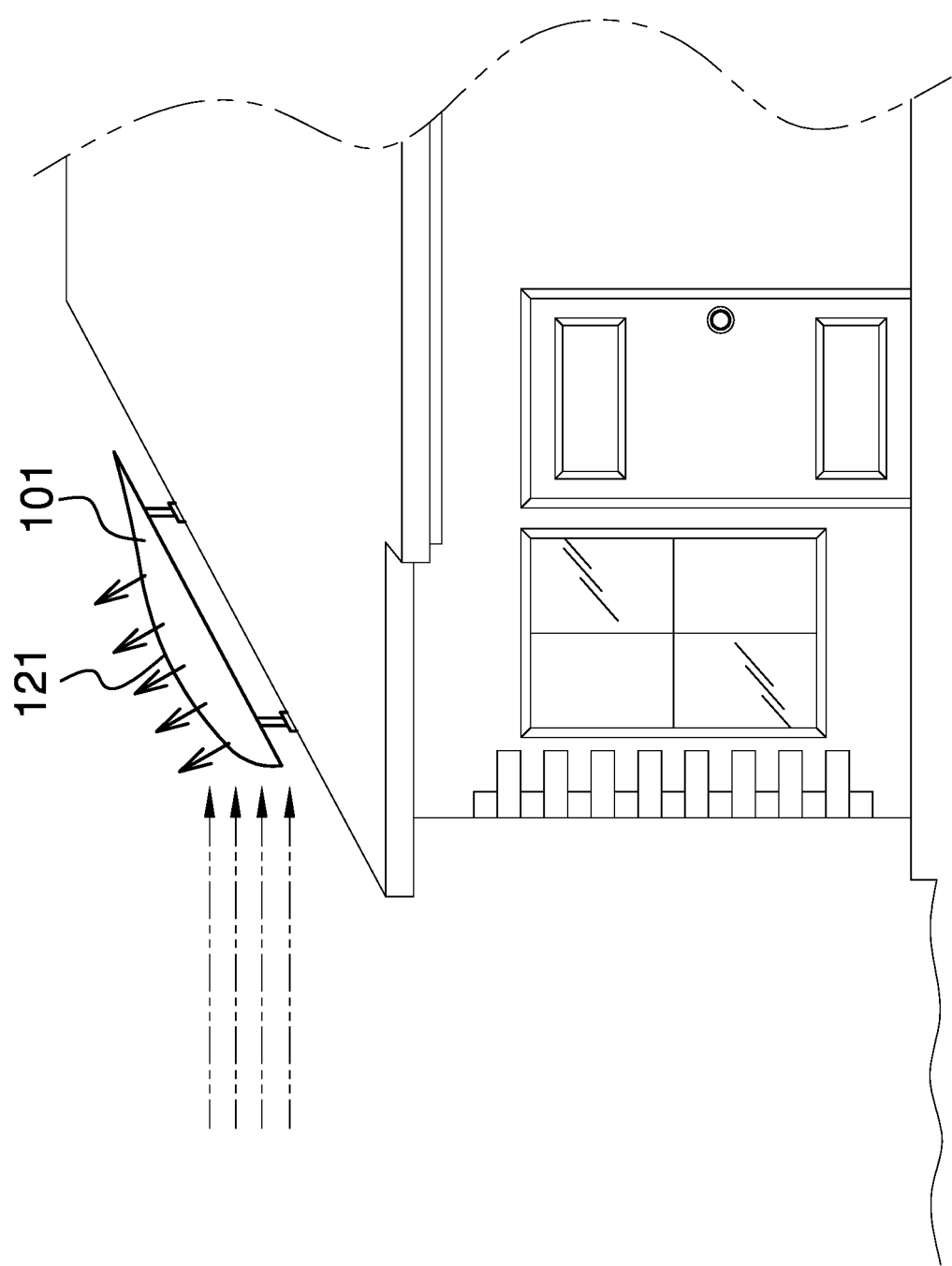
FIG. 2 is a side view of an embodiment of the disclosure.
Figure 3:
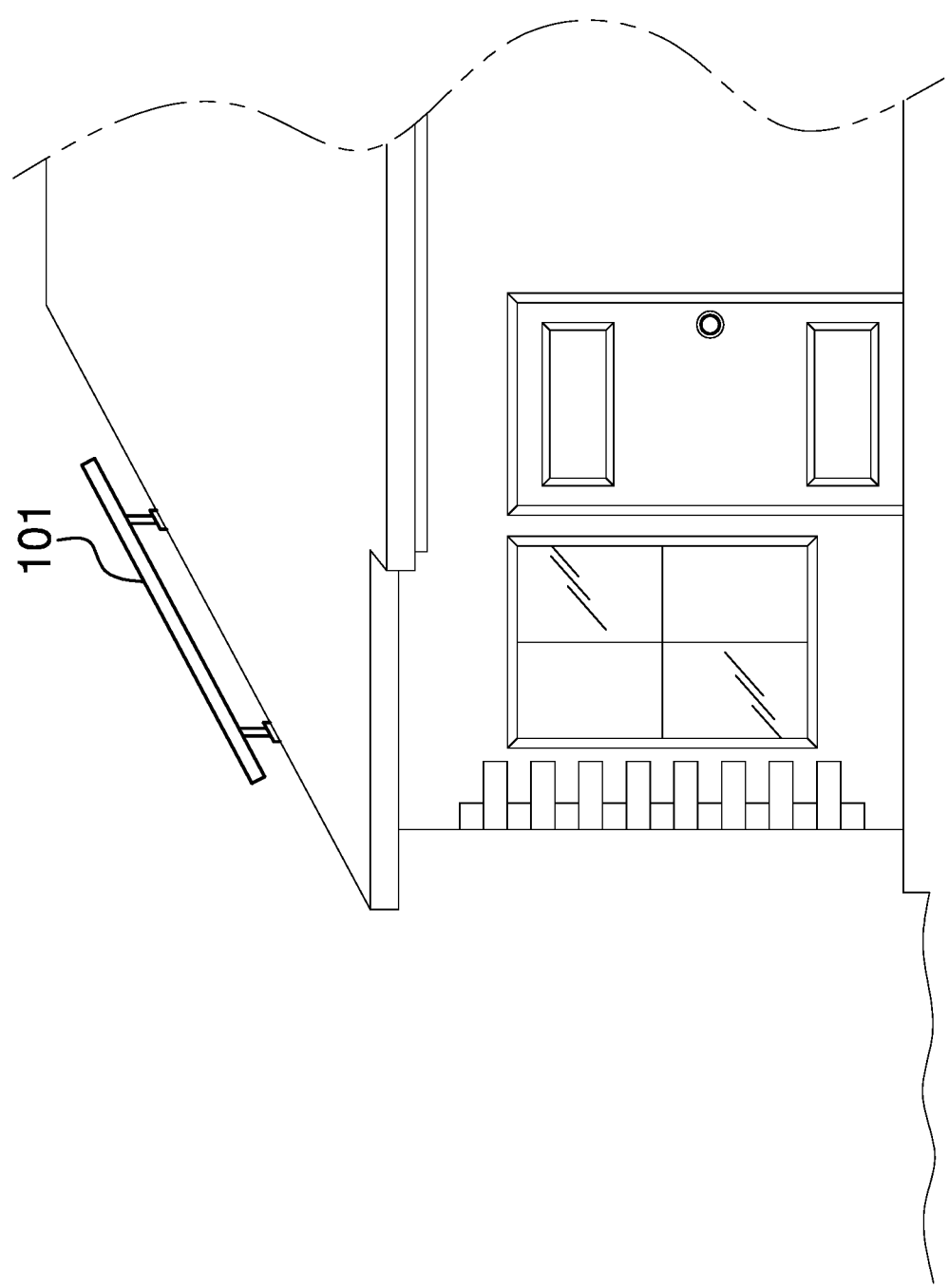
FIG. 3 is a side view of an embodiment of the disclosure.
Figure 4:
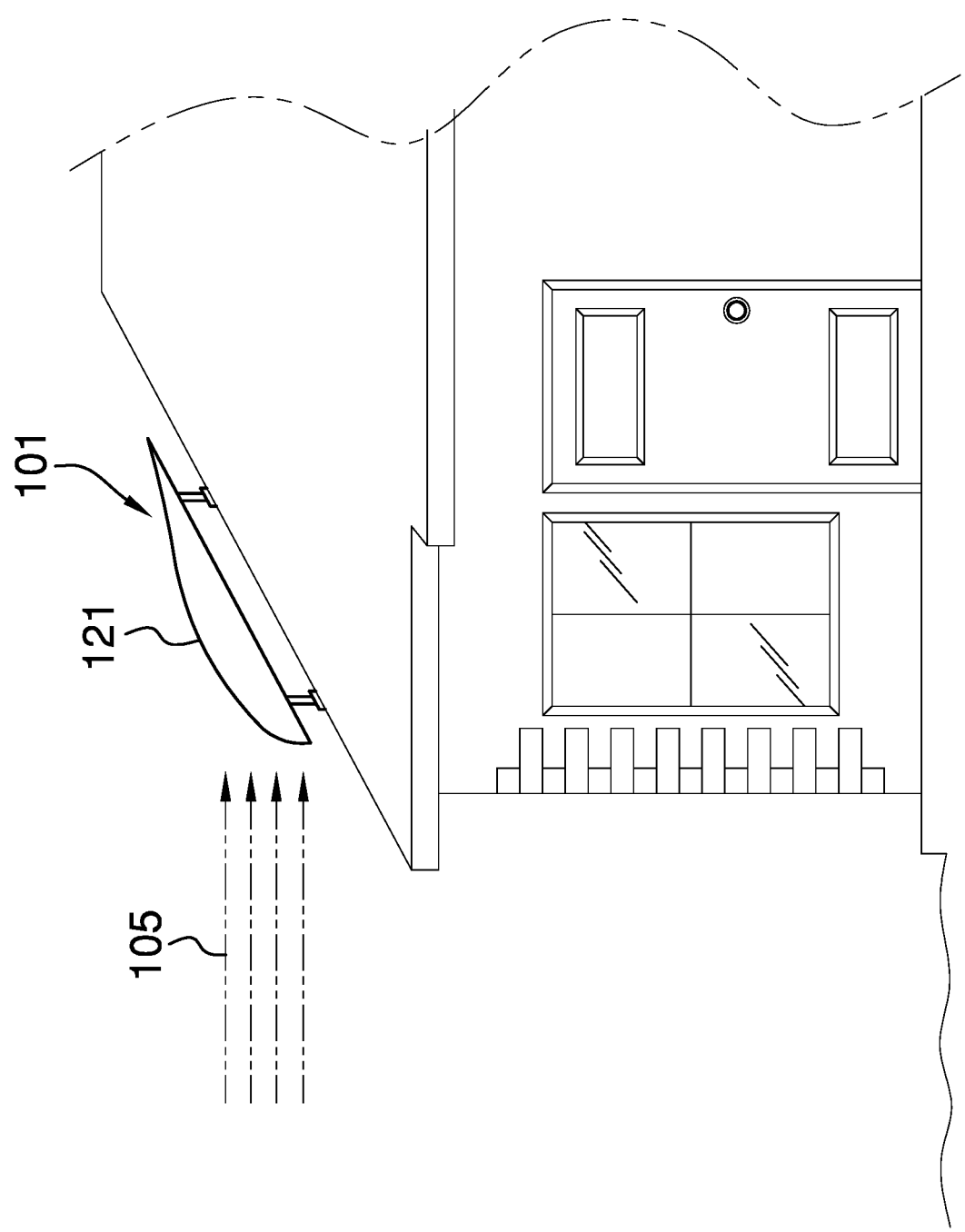
FIG. 4 is a side view of an embodiment of the disclosure.
Figure 5:
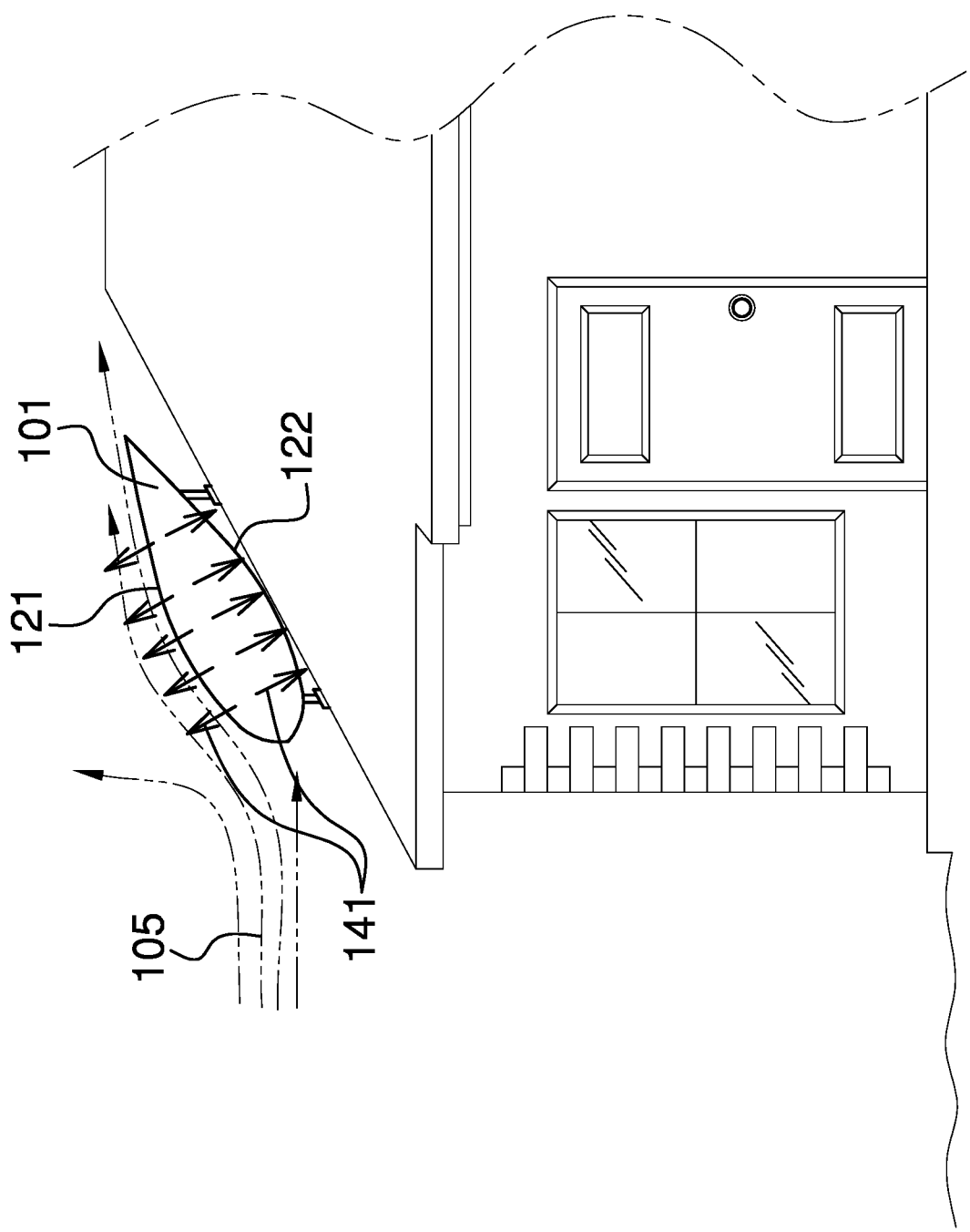
FIG. 5 is a side view of an embodiment of the disclosure.
Figure 6:
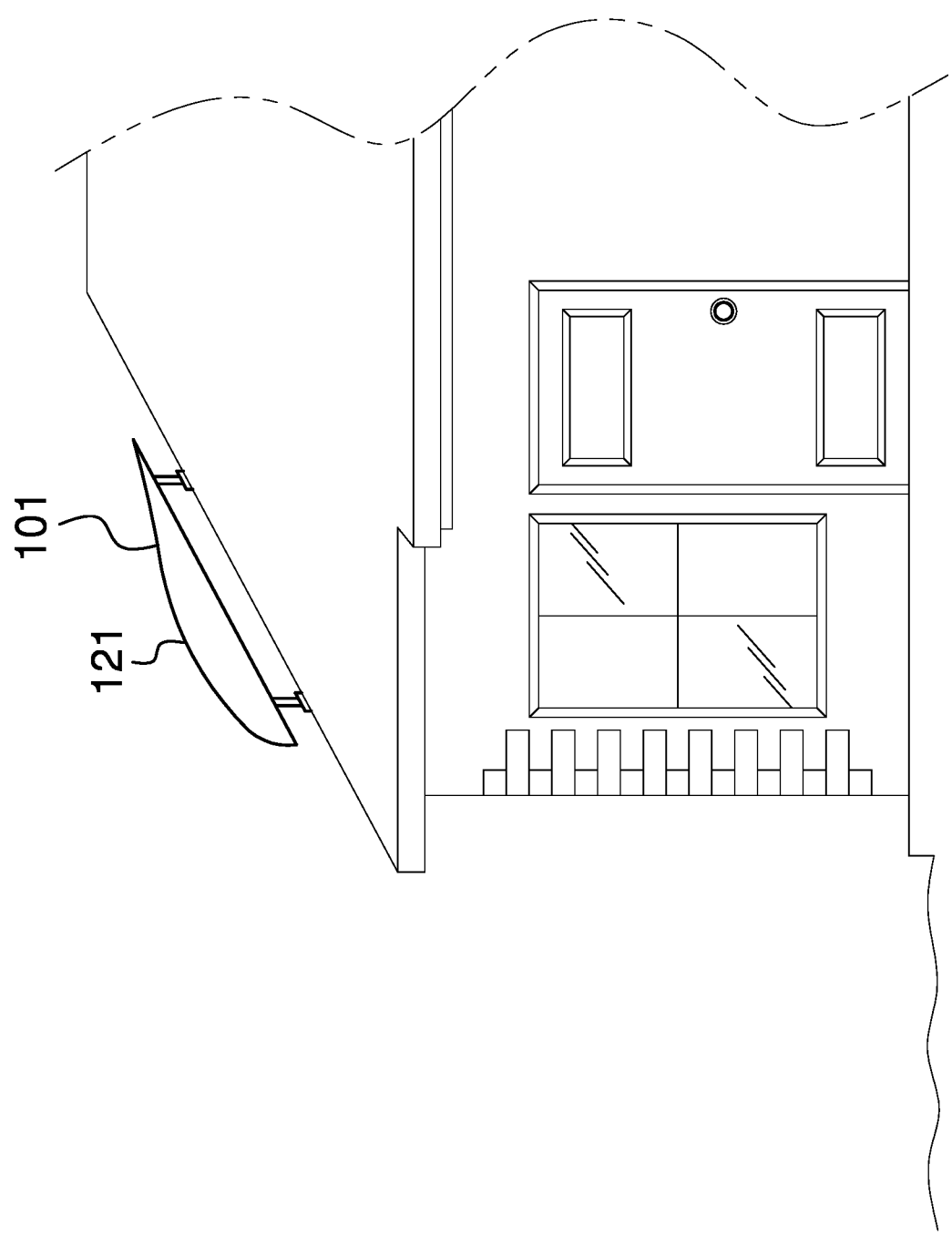
FIG. 6 is a side view of an embodiment of the disclosure.
Figure 7:
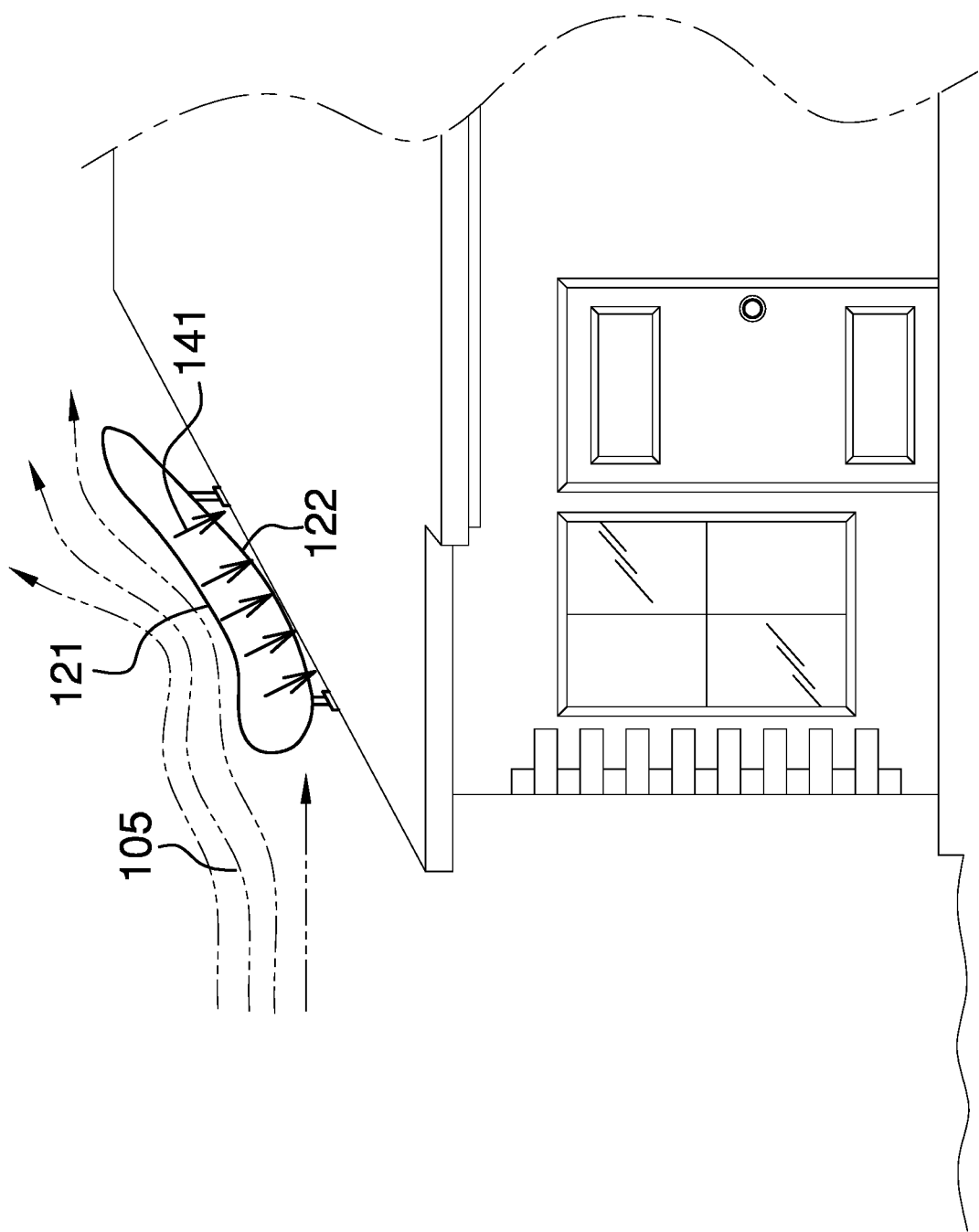
FIG. 7 is a side view of an embodiment of the disclosure.

Detailed reference will now be made to one or more potential embodiments of the disclosure, which are illustrated in FIGS. 1 through 7.

The aerodynamic solar cell system 100 (hereinafter invention) is an airfoil. The invention 100 comprises an airfoil structure 101, a pedestal structure 102, a roof structure 103, and a photovoltaic cell structure 104. The photovoltaic cell structure 104 mounts on the of the airfoil structure 101. The pedestal structure 102 attaches the airfoil structure 101 to the roof structure 103. The invention 100 is adapted for use in the wind 105. The wind 105 flows around the structure formed by airfoil. The airfoil structure 101 is an elastic structure. The airfoil structure 101 is an adaptive structure. By adaptive structure is meant that the form factor of the airfoil structure 101 changes in response to the lift forces that are applied to the airfoil structure 101 as the wind 105 flows around the airfoil structure 101. The response of the airfoil structure 101 to changes in the lift forces minimizes the load transferred from the airfoil structure 101 to the roof structure 103 through the pedestal structure 102.

The wind 105 is defined elsewhere in this disclosure. The lift force 141 is the force that is applied to the airfoil structure 101 in a direction that is perpendicular to the flow of the wind 105 around the airfoil structure 101. The drag force 142 is the force that is applied to the airfoil structure 101 in a direction that is parallel to the flow of the wind 105 around the airfoil structure 101.

The roof structure 103 forms the superior surface of a structure. The roof is defined elsewhere in this disclosure. The roof structure 103 transfers the load of the invention 100 to the structure.

The pedestal structure 102 is a load bearing structure. The pedestal structure 102 permanently secures the airfoil structure 101 to the roof structure 103. The pedestal structure 102 elevates the airfoil structure 101 above the roof structure 103. The pedestal structure 102 transfers the loads of the airfoil structure 101, the photovoltaic cell structure 104, and the loads generated by the wind 105 to the roof structure 103.

The photovoltaic cell structure 104 is a photoelectric device. The photovoltaic cell structure 104 converts electromagnetic radiation into electric energy. The photovoltaic cell structure 104 mounts in a mosaic pattern on the superior congruent end of the disk structure of the airfoil structure 101.

The airfoil structure 101 is a disk shaped structure. The airfoil structure 101 is an elastic structure. The airfoil structure 101 is an adaptive structure. By adaptive is meant that the form factor of the airfoil structure 101 changes between a Euclidean structure and a non-Euclidean structure. The airfoil structure 101 is in its relaxed shape when the airfoil structure 101 forms a Euclidean structure. The photovoltaic cell structure 104 attaches to the exterior surface of the airfoil structure 101. The photovoltaic cell structure 104 forms a mosaic structure on the exterior surface of the airfoil structure 101. The mosaic structure of the photovoltaic cell structure 104 allows the photovoltaic cell structure 104 to adjust to the change in the form factor of the airfoil structure 101.

The photovoltaic cell has a curvature as a result of being attached onto the airfoil structure either in its non-responsive state or during either the superior deformation or the inferior deformation (see FIGS. 2 and 4-7). The curvature of the photovoltaic cell structure 104 increases solar cell efficiency in that more sunlight is able to interact with the photovoltaic cell structure 104 throughout daylight.

The airfoil structure 101 has the Euclidean disk shape when the airfoil structure 101 is in a windless environment and at normal temperature and pressure. The flow of the wind 105 around the airfoil structure 101 generates a pressure differential between the inferior congruent end and the superior congruent end of the airfoil structure 101. The pressure differentials generated by the flow of the wind 105 around the airfoil structure 101 generates a lift force 141 and a drag force 142 along the exterior surfaces of the airfoil structure that deform the elastic structure of the airfoil structure 101.

The pressure differentials generated by the flow of the wind 105 around the airfoil structure 101 specifically generate a superior deformation 121 and an inferior deformation 122. The deformation of the airfoil structure 101 in response to the pressure differential generated by the wind 105 is such that the pressure differential between the superior congruent end and the inferior congruent end of the airfoil structure 101 is minimized. The minimization of the pressure differential generated by the wind 105 reduces the risk of damage to the photovoltaic cell structure 104 and the roof structure 103 of the invention 100.

The superior deformation 121 refers to the deformation of the superior congruent end of the disk structure of the airfoil structure 101. The superior deformation 121 of the superior congruent end of the disk structure of the airfoil structure 101 maintains into a Euclidean shape when the superior congruent end is exposed to normal temperature and pressure. The superior deformation 121 of the superior congruent end of the disk structure of the airfoil structure 101 deforms into a non-Euclidean shape when the airfoil structure 101 is exposed to pressures that differ from the normal temperature and pressure.

The inferior deformation 122 refers to the deformation of the inferior congruent end of the disk structure of the airfoil structure 101. The inferior deformation 122 of the inferior congruent end of the disk structure of the airfoil structure 101 maintains into a Euclidean shape when the inferior congruent end is exposed to normal temperature and pressure. The inferior deformation 122 of the inferior congruent end of the disk structure of the airfoil structure 101 deforms into a non-Euclidean shape when the airfoil structure 101 is exposed to pressures that differ from the normal temperature and pressure.

The following definitions were used in this disclosure:

Airfoil: As used in this disclosure, an airfoil is a curved structure. The airfoil is designed to move through a fluid. The design of the curvature of the airflow manipulates the forces created by the flow of the fluid around the airflow such that mechanical work is performed by the airfoil. The wing of an aircraft is an example of an airfoil. The wing is designed to maximize the lift produced by the flow of air around the wing. By lift is meant a directed force that is generated by the fluid flow that is perpendicular to the direction of the fluid flow. The term drag refers to a force that is generated by the interaction of the wing and the fluid flow. The direction of drag is parallel to the direction of the fluid flow. The term camber is used to describe a hypothetical line that runs from the leading edge of an airfoil to the trailing edge of the airfoil. The angle of attack of an airfoil means the angle between the camber and the direction of the fluid flow around the airfoil.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elastic Nature: As used in this disclosure, an elastic nature refers to a flexible structure that returns to its relaxed shape after the flexible structure has been deformed.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Euclidean Surface: As used in this disclosure, a Euclidean surface refers to a two-dimensional plane that is formed without a curvature. By without a curvature is meant that the shortest distance between any two points on a Euclidean surface forms a line that remains on the Euclidean surface.

Exterior: As used in this disclosure, the exterior is used as a relational term that implies that an object is not contained within the boundary of a structure or a space.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Force: As used in this disclosure, a force refers to a net (or unopposed) measurable interaction that changes the direction of motion of an object, the velocity of motion of an object, the momentum of an object, or the stress within an object. The term work refers to a measure of the amount of energy that is transferred through the application of a force over a distance. The term power refers to a measure of the amount of energy that is transferred over a period of time.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inelastic Nature: As used in this disclosure, an inelastic nature refers to a flexible structure that maintains its new shape after the flexible structure has been deformed.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Negative Space: As used in this disclosure, negative space is a method of defining an object through the use of open or empty space as the definition of the object itself, or, through the use of open or empty space to describe the boundaries of an object.

Non-Euclidean Disk: As used in this disclosure, a non-Euclidean structure is a disk-shaped structure wherein the congruent end (faces) of the disk structure lies on a non-Euclidean plane.

Non-Euclidean Plane: As used in this disclosure, a non-Euclidean plane (or non-Euclidean surface) is a geometric plane that is formed with a curvature such that: a) two parallel lines will intersect somewhere in the planar surface; or, b) the span of the perpendicular distance between two parallel lines will vary as a function of the position of the plane; or, c) the minimum distance between two points on the non-Euclidean plane as measured along the non-Euclidean plane is greater than the absolute minimum distance between the same two points. In many geometries, the statements (a) and (b) can be considered identical statements. A non-Euclidean plane is said to form a roughly Euclidean surface (or plane) when the span of the minimum distance between two points on the non-Euclidean plane as measured along the non-Euclidean plane is less than or equal to 1.1 times the absolute minimum distance between the same two points.

Non-Euclidean Structure: As used in this disclosure, a non-Euclidean structure is a structure wherein: a) the non-Euclidean structure is formed with a non-Euclidean plane; b) the non-Euclidean structure has an axis that lies on a non-Euclidean plane or is otherwise formed with a curvature; or, c) a combination of both (a) and (b) above.

Normal Temperature and Pressure: As used in this disclosure, normal temperature and pressure refers to gas storage conditions corresponding to 20 degrees C. at 100 kPa (approx. 1 atmosphere). Normal temperature and pressure is often abbreviated as NTP.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Phase: As used in this disclosure, phase refers to the state of the form of matter. The common states of matter are solid, liquid, gas, and plasma.

Photovoltaic Cell: As used in this disclosure, a photovoltaic cell is a photoelectric device that directly converts light energy into electrical energy.

Pressure: As used in this disclosure, pressure refers to a measure of force per unit area.

Primary Shape: As used in this disclosure, the primary shape refers to a description of the rough overall geometric shape of an object that is assembled from multiple components or surfaces.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Relaxed Shape: As used in this disclosure, a structure is considered to be in its relaxed state when no shear, strain, or torsional forces are being applied to the structure.

Roof: As used in this disclosure, a roof is the exterior surface of a structure that is distal from the surface upon which the structure is placed. As used in this disclosure, the exterior surface is assumed to include the supporting structures associated with the exterior surface including, but not limited to, rafters, decking, soffits and fascia. A pitched roof is a roof wherein the surface of the roof has a cant that is not perpendicular to the direction of gravity.

Solid: As used in this disclosure, a solid refers to a state (phase) of matter that: 1) has a fixed volume; and, 2) does not flow.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wind: As used in this disclosure, wind refers to the movement of atmospheric gases in a single direction.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An aerodynamic solar cell system comprising
an airfoil structure, a pedestal structure, a roof structure, and a photovoltaic cell structure;
wherein the photovoltaic cell structure mounts on the airfoil structure;
wherein the pedestal structure attaches the airfoil structure to the roof structure of a building;
wherein the aerodynamic solar cell system is adapted for use in the wind;
wherein the airfoil structure is an adaptive structure;
wherein by adaptive structure is meant that the form factor of the airfoil structure changes in response to lift forces that are applied to the airfoil structure as the wind flows around the airfoil structure;
wherein the response of the airfoil structure to changes in the lift forces minimizes the load transferred from the airfoil structure to the roof structure through the pedestal structure;
wherein the airfoil structure is in a relaxed shape when the airfoil structure forms a Euclidean structure.

2. The aerodynamic solar cell system according to claim 1
wherein the aerodynamic solar cell system is an airfoil;
wherein the wind flows around the airfoil structure.

3. The aerodynamic solar cell system according to claim 2
wherein the roof structure forms a superior surface of the building;
wherein the roof structure transfers the load of the aerodynamic solar cell system to the building.

4. The aerodynamic solar cell system according to claim 3,
wherein the pedestal structure is a load bearing structure;
wherein the pedestal structure permanently secures the airfoil structure to the roof structure;
wherein the pedestal structure elevates the airfoil structure above the roof structure;
wherein the pedestal structure transfers the loads of the airfoil structure, the photovoltaic cell structure, and the loads generated by the wind to the roof structure.

5. The aerodynamic solar cell system according to claim 4
wherein the photovoltaic cell structure is a photoelectric device;
wherein the photovoltaic cell structure converts electromagnetic radiation into electric energy;
wherein the photovoltaic cell structure mounts in a mosaic pattern on a superior congruent end of a disk structure of the airfoil structure.

6. The aerodynamic solar cell system according to claim 5
wherein the airfoil structure is an elastic structure.

7. The aerodynamic solar cell system according to claim 6
wherein the photovoltaic cell structure attaches to an exterior surface of the airfoil structure;
wherein the photovoltaic cell structure forms a mosaic structure on the exterior surface of the airfoil structure;
wherein the mosaic structure of the photovoltaic cell structure allows the photovoltaic cell structure to adjust to the change in the form factor of the airfoil structure.

8. The aerodynamic solar cell system according to claim 7
wherein the airfoil structure has the relaxed shape when the airfoil structure is in a windless environment and at normal temperature and pressure;
wherein the flow of the wind around the airfoil structure generates a pressure differential between an inferior congruent end and a superior congruent end of the airfoil structure;
wherein the pressure differential generated by the flow of the wind around the airfoil structure generates the lift force and a drag force along the exterior surface of the airfoil structure that deform the elastic structure of the airfoil structure.

9. The aerodynamic solar cell system according to claim 8 wherein the deformation of the airfoil structure in response to the pressure differential generated by the flow of the wind is such that the pressure differential between a superior congruent end and an inferior congruent end of the airfoil structure is minimized.

10. The aerodynamic solar cell system according to claim 9
wherein the pressure differential generated by the flow of the wind around the airfoil structure specifically generates a superior deformation and an inferior deformation;
wherein the superior deformation refers to the deformation of the superior congruent end of the disk structure of the airfoil structure;
wherein the superior deformation of the superior congruent end of the disk structure of the airfoil structure maintains a Euclidean shape when the superior congruent end is exposed to the normal temperature and pressure;
wherein the superior deformation of the superior congruent end of the disk structure of the airfoil structure deforms into a non-Euclidean shape when the airfoil structure is exposed to pressures that differ from the normal temperature and pressure;
wherein the inferior deformation refers to the deformation of the inferior congruent end of the airfoil structure;
wherein the inferior deformation of the inferior congruent end of the airfoil structure maintains a Euclidean shape when the inferior congruent end is exposed to the normal temperature and pressure;
wherein the inferior deformation of the inferior congruent end of the airfoil structure deforms into a non-Euclidean shape when the airfoil structure is exposed to pressures.

11. The aerodynamic solar cell system according to claim 9
wherein the photovoltaic cell structure has a curvature as a result of being attached onto the airfoil structure during either the superior deformation or the inferior deformation;
wherein the curvature of the photovoltaic cell structure increases solar cell efficiency in that more sunlight is able to interact with the photovoltaic cell structure throughout daylight.

* * * * *